(12) United States Patent
Graf et al.

(10) Patent No.: US 7,896,976 B2
(45) Date of Patent: Mar. 1, 2011

(54) VENTILATION DEVICE FOR THE DISCHARGE PIPE OF A WATER SUPPLY HOUSEHOLD APPLIANCE

(75) Inventors: Gerhard Graf, Dillingen (DE); Bernd Hesterberg, Heidenheim (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 1029 days.

(21) Appl. No.: 11/662,104

(22) PCT Filed: Aug. 2, 2005

(86) PCT No.: PCT/EP2005/053775
§ 371 (c)(1),
(2), (4) Date: Mar. 6, 2007

(87) PCT Pub. No.: WO2006/027295
PCT Pub. Date: Mar. 16, 2006

(65) Prior Publication Data
US 2008/0072933 A1 Mar. 27, 2008

(30) Foreign Application Priority Data
Sep. 7, 2004 (DE) .......................... 10 2004 043 248
Oct. 1, 2004 (DE) .......................... 10 2004 047 994

(51) Int. Cl.
*B08B 3/00* (2006.01)
*E03D 9/04* (2006.01)
(52) U.S. Cl. .................. 134/56 D; 134/57 D; 134/58 D; 134/96.1; 4/211; 4/216
(58) Field of Classification Search .............. 4/211, 216; 134/56 D, 57 D, 58 D, 91, 96.1, 155, 186
See application file for complete search history.

(56) References Cited

U.S. PATENT DOCUMENTS
2,482,359 A * 9/1949 Molloy ..................... 137/247.31
(Continued)

FOREIGN PATENT DOCUMENTS
DE 66 859 1/1968
(Continued)

OTHER PUBLICATIONS
English Abstract of German Patent Application Publication DE 29722975 to Bosch, Feb. 1998.*
(Continued)

*Primary Examiner* — Joseph L Perrin
*Assistant Examiner* — Benjamin Osterhout
(74) *Attorney, Agent, or Firm* — James E. Howard; Andre Pallapies

(57) ABSTRACT

A ventilation device for the discharge pipe for removing a flow medium pumped to a household appliance. A pipe ventilation valve is connected to the discharge pipe by a channel and comprises a valve body disposed in a float chamber filled with a working medium which is separated from the flow medium and actuates the valve body. The valve body is actuated by transmitting a pneumatic force between the flowing medium and the working medium of the float chamber or between the flowing medium and a sealing surface adjacent to the valve body by means of a pressure medium which is separated from the flowing medium and is enclosed in the channel. The inventive pipe ventilation device makes it possible to avoid a direct contact between the valve body of the pipe ventilation valve and the flowing medium, thereby preventing the valve body from being soiled.

17 Claims, 1 Drawing Sheet

U.S. PATENT DOCUMENTS

Figure 1:
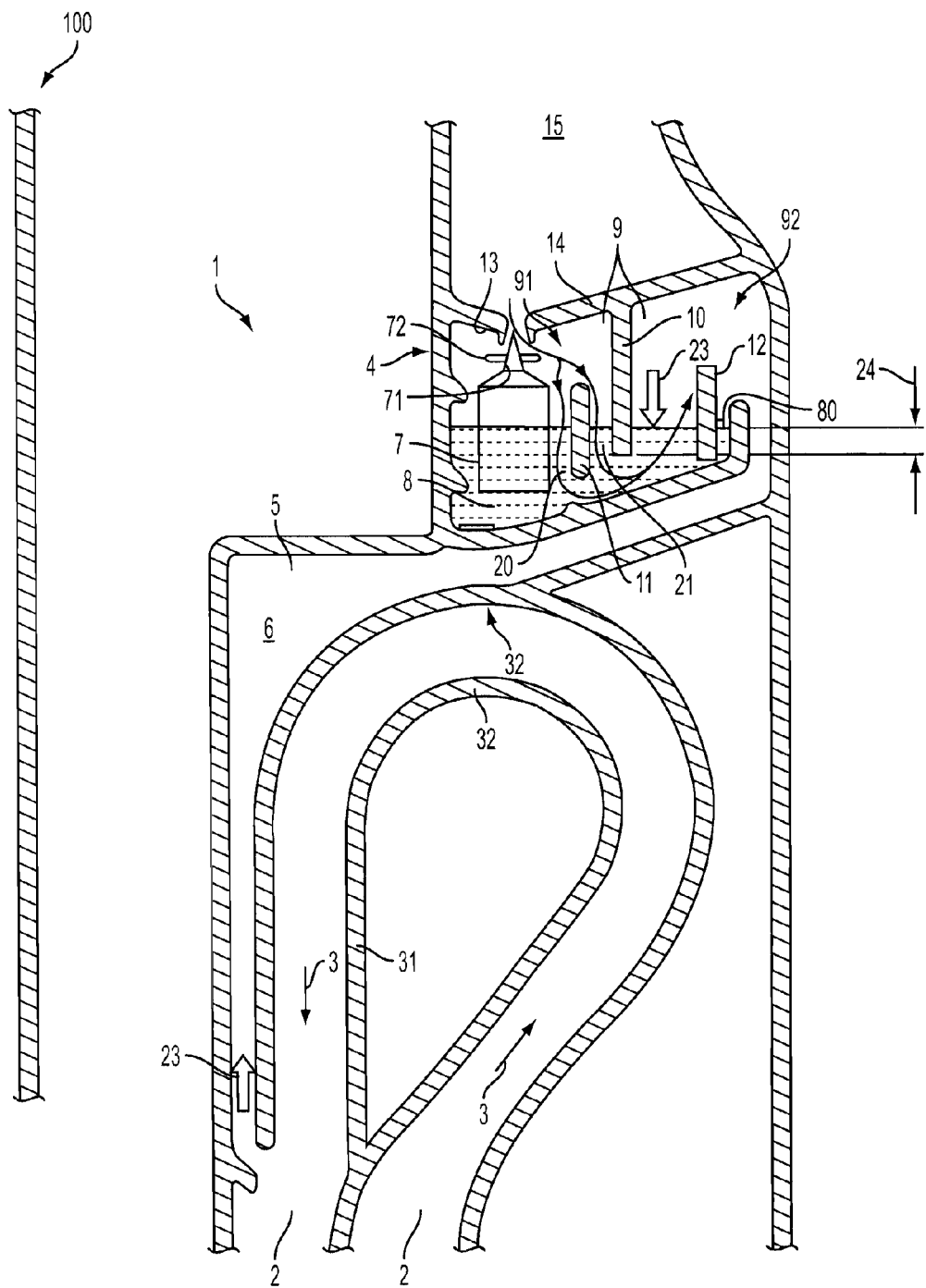

| | | | |
|---|---|---|---|
| 3,579,650 A * | 5/1971 | Sloan | 4/347 |
| 3,929,149 A * | 12/1975 | Phillips | 137/216 |
| 4,034,422 A * | 7/1977 | Farber et al. | 241/36 |
| 5,016,667 A * | 5/1991 | Tolf | 137/143 |
| 6,684,415 B1 * | 2/2004 | Kozono | 4/211 |

FOREIGN PATENT DOCUMENTS

| | | |
|---|---|---|
| DE | 2 002 588 | 8/1971 |
| DE | 2023 299 | 11/1971 |
| DE | 297 22 975 U | 2/1998 |
| EP | 0 033 010 | 8/1981 |
| GB | 1 315 579 | 5/1973 |
| JP | 5-79080 | 3/1993 |
| WO | WO 00/50684 | 8/2000 |

OTHER PUBLICATIONS

International Search Report PCT/EP2005/053775.

* cited by examiner

VENTILATION DEVICE FOR THE DISCHARGE PIPE OF A WATER SUPPLY HOUSEHOLD APPLIANCE This invention relates to a pipe ventilating device for a discharge pipe for removing a flow medium to be pumped to a water-conducting household appliance. The invention also relates to a water-conducting household appliance with such a pipe ventilating device.

In water-conducting household appliances such as a dishwasher, pumps called lye pumps are used for pumping off washing liquid that is no longer required. In order to be able to remove the washing liquid no longer required as fully as possible from the household appliance it is normally pumped off from the lowest point of the household appliance. It may be the case here that the drain pipe on the house side is lower than the lowest point of the household appliance so that if the washing liquid is partially pumped off according to a programme a sucking action in the drain pipe. It may also happen that the water is sucked accidentally from the appliance by a vacuum in the house drain system.

To prevent this effect it is normal, particularly in dishwashers, to provide a vertical wall for the discharge channel in the appliance to prevent the appliance from being sucked dry. A channel wall raising device that is often used has a vertically running section of a discharge pipe which passes into a pipe section that is bent in a U-shape so that it again opens into a vertically arranged pipe section connected to it.

A dishwasher with a discharge channel raising device of this type is disclosed in DE-OS 2 023 299 in which a pipe ventilating part is arranged at the highest point of the U-shaped pipe section of the discharge pipe. The washing liquid is prevented from running out by raising the discharge pipe when the drain pump is switched off.

DE 297 22 975 U1 also discloses a dishwasher with such a discharge channel raising device in which the pipe ventilating valve is arranged approximately at the highest point of the discharge pipe in a branch of the discharge pipe leading to a ventilating channel. The pipe ventilating valve has a valve body designed as a float, with a closing body which in the sealing position bears against a contact surface of a partition between the branch and the ventilating channel. When the drain pump comes into operation and the soiled liquid is conveyed upwards in the discharge pipe, the liquid also penetrates the branch of the pipe ventilating vale and actuates the valve body so that the closing body bears in a sealing manner against the contact surface. As soon as the liquid flow is interrupted in the discharge pipe the valve body drops down due to its own weight, thereby reliably guaranteeing effective ventilation of the discharge pipe and the drain pump. In this arrangement it is a disadvantage for the dirty liquid, conveyed upwards, also to flow between the closing body and the contact surface of the partition, with the possibility of dirt being deposited on the contact surface which may decisively impair the sealing action of the pipe ventilating valve.

DE 2 002 588 C3 describes a double reflux seal for drain pipes which prevents the penetration of solids contained in the dammed up wastewater over long periods between the seat and valve body of an automatic valve, A valve opening against the direction of reflux, with a valve body in the form of a screen or grid, lies downstream from an automatic sealing mechanism, viewed in the direction of reflux, for retaining at least coarse dirt particles. The disadvantage of this solution is that such a downstream valve, in the form of a screen or grid, can be easily soiled since the dirty water to be pumped off also passes through it.

A similar problem also relates to the shutoff valve according to DD 66859 PS. According to the shutoff principle described there two automatically acting seal stages, connected one behind the other, are put into operation separately when reflux occurs, so that practically absolute safety is guaranteed. Balls which float on the water surface serve as sealing mechanisms and are pressed against seals of flow openings even if there is only a slight rise in the channel water level.

EP 0 033 010 B1 discloses a float check valve with a float housing which encloses a float chamber with a floating ball arranged therein and has an inlet and outlet opening for the liquid flowing through it. The outlet opening is arranged underneath the float chamber, a pipe leading away from the outlet opening projecting into the lower half of a siphon housing. An overflow opening is arranged in the upper half of the siphon housing. If a gas bubble is present in the pipe system leading away from the siphon housing, it cannot the pipe system leading to the float housing in the event of reflux. For the water volume present in the siphon housing is pushed in front of the gas bubble and closes the check valve in good time. The gas is prevented from flowing back with such a float check valve. Nevertheless, a portion of the dirt entrained by the returning water may become stuck between the floating ball and the seal.

The object of this invention is to indicate a pipe ventilating device for a discharge pipe for removing a flow medium for pumping to a water-conducting household appliance, which device is of simple construction and provides a certain shutoff of a ventilating valve when flow medium is dammed up. A further object of this invention is to indicate a suitable water-conducting household appliance.

This object is achieved by a pipe ventilating device for a discharge pipe in a water-conducting household appliance according to Claim 1, and by a water-conducting household appliance with such a pipe ventilating device according to Claim 14.

The pipe ventilating device according to the invention, for a discharge pipe, has a pipe ventilating valve which is connected by a channel to the discharge pipe for removing a flow medium to be pumped off. The pipe ventilating valve has a valve body designed as a float for closing and opening the pipe ventilating valve. The valve body is arranged in a float chamber which is filled with a working medium separated from the flow medium in order to actuate the valve body. In this case the float chamber is connected to the discharge pipe so that force is transmitted pneumatically between the flow medium of the discharge pipe and the working medium of the float chamber by means of a pressure medium separated from the flow medium for actuating the valve body, which flow medium is closed in the channel.

Another variant equivalent in terms of the principle of action provides that force is transmitted pneumatically and directly between the flow medium of the discharge pipe and a sealing surface of the valve body bearing against it via a pressure medium separated from the flow medium, for actuating the valve body, which pressure medium is closed in the channel. Here the working medium of the float chamber is provided to exert preloading, in the manner of a spring resilience, upon the valve body, which is pressed down into the working medium by vacuum in the channel when force is transmitted pneumatically in order to open the ventilating valve. The surface level of the working medium is not altered by the vacuum in this case.

A major advantage of this invention is that in the pipe ventilating device the valve body of the pipe ventilating valve does not generally come into contact with the flow medium pumped out of the household appliance by the pump. Instead the valve body of the pipe ventilating valve and the discharge pipe are connected together by a separate channel, which encloses a pressure medium, in order to actuate the valve body of the pipe ventilating valve. According to this principle the pressure medium serves to transmit force pneumatically between the flow medium and the working medium of the float chamber or the valve body itself for actuating the valve body, so that the valve body is actuated by the flow medium without direct contact. This excludes the possibility of the sealing surface of the valve body coming into contact with dirt particles from the flow medium, with the result that good sealing of the pipe ventilating valve is always guaranteed in the closed position. With the provision of the additional float chamber the switching function of the pipe ventilating valve can be adjusted by means of the pressure of the pressure medium and/or by establishing a suitable surface level of the working medium of the float chamber. Direct contact of the valve body with the flow medium and hence soiling of the valve body are therefore avoided. The ventilating function of the pipe ventilating is still guaranteed with vacuum in the discharge pipe because the air required for this is sucked through the float chamber by the working medium. The pipe ventilating device according to the invention is further characterised by a comparatively simple structure because no additional valve parts are required, contrary to the device according to DE 297 22 975 U1.

According to an advantageous embodiment of the invention the float chamber is divided into two regions, both of which are filled with the working medium, where the valve body is arranged in a first region and the working medium lies adjacent to the pressure medium in a second region. The force is therefore transmitted pneumatically from the pressure medium to the valve body via the working medium of the second region, which working medium transmits the force exerted by the pressure medium to the working medium of the first region in order to actuate the valve body. For example, the surface level of the working medium in the second region is reduced by the pressure medium as a result of the pressure exerted, thereby raising the surface level of the working medium in the first region. The valve body designed as a floating body therefore floats and is in the sealing position.

The float chamber for receiving the working medium is designed in the shape of a basin, for example, the working medium having in the position of rest a uniform surface inside the float chamber. A chamber wall divides the float chamber into the first and second region, the chamber wall being immersed in the working medium. The chamber wall preferably immerses in the working medium so that the force can be transmitted between the working medium of the first region and the working medium of the second region without disturbance. If there is excess pressure in the discharge pipe when the flow medium is pumped off, the working medium of the second region, which communicates with the pressure medium, is forced down by the pressure so that the surface level of the working medium in the first region increases and raises the valve body in order to close the pipe ventilating valve. If there is a vacuum in the discharge pipe after the discharge pump has finished pumping off the flow medium, the respective surface levels of the working medium of the first and second regions of the float chamber move in opposite directions so that the valve body can be removed from the sealing position and the air can be sucked out of a ventilating channel.

According to an advantageous embodiment of the invention, water is contained in the float chamber as the working medium. In this case the float chamber can be advantageously filled with fresh water when the appliance is commissioned, as is also usually the case, for example, with other components of a dishwasher. Air which is enclosed in the channel between the discharge pipe and the float chamber is preferably used as the pressure medium.

According to an advantageous embodiment of the invention the valve body and the working medium of the float chamber are arranged in a presetting device so that the valve body is in the sealing position of the pipe ventilating valve. This means that in the position of rest of the pipe ventilating device the valve body is already occupying the sealing position and air is only sucked out of a ventilating channel when there is a vacuum in the discharge pipe. In this case the valve body is moved out of the sealing position as a result of lowering of the surface level due to the vacuum and air is sucked from the ventilating channel by the working medium through into the channel.

According to a further development of the invention the water-conducting household appliance has a pipe ventilating device in which the pipe ventilating valve is arranged above a point on the discharge pipe that is the highest point in the operating condition of the appliance. Such an arrangement can effectively prevent the soiled wastewater from reaching the pipe ventilating valve as a result of the counteracting force of gravity.

In particular a device is provided for raising the drain channel to prevent sucking empty the appliance, the discharge pip having a pipe section that is vertical when the appliance is in operation for discharging the flow medium to be pumped off and a pipe section bent in a U-English shape and arranged above the vertical pipe section, which bent pipe section is connected to the vertical pipe section. This causes the flow medium to already move in the downward direction by passing through the U-shaped pipe section, thus making it extremely difficult for dirt particles to penetrate the channel and hence the pipe ventilating valve arranged above it.

Further advantageous embodiments and further developments are indicated in the dependent claims.

The invention is explained in greater detail in the following with reference to the FIGURE shown in the drawing, which represents an advantageous embodiment of this invention.

The FIGURE shows a section through a flat appliance unit with an embodiment of a pipe ventilating device according to the invention such as that contained in a dishwasher in particular the dishwasher not explained in further detail in the following has a wastewater pump, not shown, with which, for example, washing water soiled at the end of a partial programme section is pumped out of a washing container to which the drain pump is connected with its suction side. On the pressure side of this drain pump discharge pipe 2 is connected for removing washing water 3 to be pumped off in the direction indicated by the arrows. This discharge pipe 2 is normally integrated in a flat appliance unit which serves to accommodate different components, for example an inlet pipe or a liquid storage container. Such a flat appliance unit is arranged between a lateral wall of the washing container and a housing 100 of the dishwasher. Discharge pipe 2 is integrated in this appliance unit with its drain channel raising device, discharge pipe 2 having a vertical pipe section 31 and a pipe section 32 bent in a U-shape and arranged above it, which pipe section 32 is connected to vertical pipe section 31.

A pipe ventilating valve 4 is arranged above highest point 30 of discharge pipe 2, which valve is part of pipe ventilating device 1 according to the invention. Pipe ventilating valve 4 is connected by channel 5 to discharge pipe 2, channel 5 being connected to discharge pipe 2 in the direction of discharge of washing water 3 after U-shaped pipe section 32. Pipe ventilating valve 4 has a valve body 7 designed as a float for closing and opening the pipe ventilating valve. Valve body 7 is arranged in a float chamber 9 which is filled with a working medium 8, for example with fresh water, separated from washing water 3. Valve body 7 is actuated by working medium 8 of float chamber 9.

According to the embodiment shown in the FIGURE, valve body 7 is designed as a cylinder open towards working medium 8, with a conically converging tip 71. Furthermore, valve body 7 has a separate closing body 72 which is arranged on tip 71 of the valve body and bears against a contact surface 13 of a partition 14 between float chamber 9 and a ventilating channel 15 in the sealing position of pipe ventilating valve 4. A diaphragm of an elastic material, in the shape of a circular ring, for example, may serve as closing body 72, which diaphragm is secured by folding over tip 71 of valve body 7 and is retained in a groove not shown. Closing body 72 lies in the sealing position on a contact surface 13 of partition 14 between float chamber 9 and ventilating channel 15, which surface is designed as shoulders in the shape of a circular ring projecting in the direction of valve body 7.

Float chamber 9 is divided into two regions 91 and 92, both of which are filled with working medium 8. Valve body 7 is arranged in first region 91, and working medium 8 lies adjacent to pressure medium 6 of channel 5 in second region 92, which channel contains air, for example. Float chamber 9 is designed in the manner of a basin, working medium 8 having a uniform surface 80 inside float chamber 9 in the position of rest. A chamber wall 10 divides float chamber 9 into first and second regions 91, 92 and is immersed in working medium 8 with a cover 24. The discharge pipe is ventilated safely and effectively by channel 5 with the downward movement of valve body 7 as a result of gravity and by the application of a low vacuum in discharge pipe 2.

In the FIGURE represented pipe ventilating valve 4 is shown in an open position as the position of rest. According to another embodiment valve body 7, and correspondingly working medium 8, is arranged in a presetting device so that valve body 7 is in the sealing position of pipe ventilating valve 4. This means that float chamber 9 is filled with working medium 8 until floating valve body 7 presses against contact surface 13 of partition 14 with its closing body 72 in order to close the valve.

When the drain pump comes into operation and washing water 3 lifts washing water 3 in discharge pipe 2, the washing water also penetrates a short distance into channel 5, thereby exerting a pressure on air 6 enclosed in channel 5. Air 6 enclosed inside channel 5 therefore provides a pneumatic force transmission (indicated by the forces denoted by reference number 23) between washing water 3 inside discharge pipe 2 and working medium 8 of float chamber 9. Force 23 exerted thereby on working medium 8 presses down surface level 80 of working medium 8 in second region 92 so that surface level 80 of working medium 8 in first region 91 moves upwards. Consequently valve body 7 floats up and is moved into the sealing position or is pressed further into the sealing position. This guarantees that closing body 72 of valve body 7 bears against contact surface 13 in a sealing manner. Valve body 7 is guided by means of projecting ribs in the left lateral wall of float chamber 9 and preferably by a separate guiding device 11 which is arranged inside float chamber 9.

As soon as the liquid flow of washing water 3 is interrupted in discharge pipe 2, a vacuum in discharge pipe 2 is generated by the discharging washing water 3, so that a vacuum is generated in channel 5. A force opposing force 23 is exerted by this vacuum on working medium 8 in second region 92 of float chamber 9, so that surface level 80 of working medium 8 rises in region 92 and the surface level of working medium 8 drops in region 91. Valve body 7 is therefore moved out of its sealing position and the air is sucked out of ventilating channel 15. For this purpose a lateral channel 21 is formed inside float chamber 9 between guiding device 11 and chamber wall 10 of float chamber 9, via which chamber the air is sucked out of ventilating channel 15 and extends through the working medium into channel 5. A further air flow is obtained through channel 20 between guiding device 11 and valve body 7. In order to settle working medium 8 when the air is sucked out of ventilating channel 15, at least one vertically arranged rib 12 is provided inside float chamber 9, which rib is partially immersed in working medium 8. The depth of immersion of chamber wall 10 in working medium 8 (cover 24) is chosen so that valve 7 can be effectively actuated without eliminating the effective air barrier. This ensures reliable force transmission between working medium 8 of region 91 and working medium 8 of region 92. Effective ventilation of discharge pipe 2 by channel 5 is therefore safely guaranteed with the downward movement of valve body 7 as a result of its force of gravity.

Another equivalent variant, from the point of view of the principle of action, provides that a force is transmitted pneumatically and directly between flow medium 3 of discharge pipe 2 and a sealing surface of valve body 7 bearing against contact surface 13 or partition 14 by pressure medium 6 which is enclosed inside channel 5, for actuating valve body 7. In this case there is no chamber wall 10 of float chamber 9, so that channel 5 interacts directly with valve body 7. Working medium 8 of float chamber 9 is provided in order to exert a preload upon valve body 7 in the manner of a spring resilience, which body, when the force is transmitted pneumatically, is forced down into working medium 8 by vacuum in channel 5, in order to open the ventilating valve. The surface level of working medium 8 is not altered by the vacuum. The sealing force of the float is also increased when the pressure is increased by the preload.

Here the pipe ventilating device according to the invention affords the essential advantage that pipe ventilating valve 4 or valve body 7 does not come into contact with dirty water, which is pumped off in discharge pipe 2 by the drain pump. Firstly air 6 enclosed in channel 5 acts as a pneumatic barrier against dirty water penetrating channel 5, and secondly the intrinsic weight of the dirt particles makes it difficult to advance to pipe ventilating valve 4 because it is arranged above highest point 30 of discharge pipe 2. This effectively prevents failure of the pipe ventilating valve due to dirt since direct contact of valve body 7 with washing water 3 and hence soiling of the valve body is avoided.

LIST OF REFERENCE NUMBERS

1 Pipe ventilating device
2 Discharge pipe
3 Flow medium
4 Pipe ventilating valve
5 Channel
6 Pressure medium
7 Valve body
8 Working medium
9 Float chamber
10 Chamber wall
11 Guiding device
12 Rib
13 Contact surface
14 Partition
15 Ventilating channel
20, 21 Lateral channel 23 Force
24 Cover
71 Tip
72 Closing body
80 Surface of the working medium
91 First region
92 Second region

The invention claimed is:

1. A pipe ventilating device for a discharge pipe for removing a flow medium to be pumped to a water-conducting household appliance, the pipe ventilating device comprising:
a pipe ventilating valve connectable by a channel to a discharge pipe wherein a discharge flow medium to be pumped off flows through the discharge pipe, the pipe ventilating valve having an opening and a valve body for closing and opening the pipe ventilating valve opening; and a float chamber in which the valve body is disposed, the float chamber retaining therein a working medium with the working medium in the float chamber and the flow medium in the discharge pipe not being in contact with one another and the valve body floating in the float chamber such that valve body is moved into a seating position against the pipe ventilating valve opening to thereby close the pipe ventilating valve when the level of the working medium in the float chamber rises above a predetermined level and the valve body being moved out of its seating position against the pipe ventilating valve opening to thereby open the pipe ventilating valve when the level of the working medium in the float chamber drops below the predetermined level, the float chamber being connected to the discharge pipe by the channel and the channel being filled with a pressure medium such that a pneumatic force transmission takes place in that, when the discharge flow medium is flowing the discharge pipe, the discharge flow medium exerts a force on the pressure medium in the channel and the pressure medium in the channel, in turn, exerts a force on the working medium in the float chamber and this pneumatic force transmission effects a change in the level of the working medium of the float chamber.

2. The pipe ventilating device according to claim 1, wherein the float chamber is divided into two regions, both of which are filled with the working medium, wherein the valve body is arranged in a first region and the working medium lies adjacent to the pressure medium in a second range.

3. The pipe ventilating device according to claim 2, wherein the float chamber is configured as a basin for receiving the working medium, wherein the working medium, in the position of rest, has a uniform surface inside the float chamber, and a chamber wall divides the float chamber into the first and second regions, wherein the chamber wall is immersed in the working medium.

4. The pipe ventilating device according to claim 3, wherein the chamber wall is immersed in the working medium to a depth such that a force can be transmitted between the working medium of the first region and the working medium of the second region.

5. The pipe ventilating device according to claim 1, wherein a separate guiding device is arranged inside the float chamber for guiding the valve body.

6. The pipe ventilating device according to claim 5, wherein a lateral channel is formed inside the float chamber between the guiding device and the chamber wall of the float chamber.

7. The pipe ventilating device according to claim 1, wherein at least one vertically arranged rib is arranged inside the float chamber, which rib is partially immersed in the working medium in order to settle the working medium when air is sucked in.

8. The pipe ventilating device according to claim 1, wherein air is enclosed in the channel as the pressure medium.

9. The pipe ventilating device according to claim 1, wherein water is contained in the float chamber as the working medium.

10. The pipe ventilating device according to claim 1, wherein the valve body bears against a contact surface of a partition between the float chamber and a ventilating channel in the sealing position of the pipe ventilating valve.

11. The pipe ventilating device according to claim 1, wherein the valve body is designed as a cylinder open towards the working medium with a conically converging tip.

12. The pipe ventilating device according to claim 1, wherein the valve body has a separate closing body which is arranged on one tip of the valve body and, in the sealing position of the pipe ventilating valve, bears against a contact surface of a partition between the float chamber and a ventilating channel.

13. The pipe ventilating device according to claim 1, wherein the valve body and the working medium are arranged in a presetting device so that the valve body is in the sealing position of the pipe ventilating valve.

14. A water-conducting household appliance comprising:
an assembly for conducting water; and
a pipe ventilating device for a discharge pipe for removing a flow medium to be pumped to a water-conducting household appliance, the pipe ventilating device including a pipe ventilating valve connectable by a channel to a discharge pipe wherein a discharge flow medium to be pumped off flows through the discharge pipe, the pipe ventilating valve having an opening and a valve body for closing and opening the pipe ventilating valve opening, and a float chamber in which the valve body is disposed, the float chamber retaining therein a working medium with the working medium in the float chamber and the flow medium in the discharge pipe not being in contact with one another and the valve body floating in the float chamber such that valve body is moved into a seating position against the pipe ventilating valve opening to thereby close the pipe ventilating valve when the level of the working medium in the float chamber rises above a predetermined level and the valve body being moved out of its seating position against the pipe ventilating valve opening to thereby open the pipe ventilating valve when the level of the working medium in the float chamber drops below the predetermined level, the float chamber being connected to the discharge pipe by the channel and the channel being filled with a pressure medium such that a pneumatic force transmission takes place in that, when the discharge flow medium is flowing the discharge pipe, the discharge flow medium exerts a force on the pressure medium in the channel and the pressure medium in the channel, in turn, exerts a force on the working medium in the float chamber and this pneumatic force transmission effects a change in the level of the working medium of the float chamber.

15. The water-conducting household appliance according to claim 14, wherein the valve body is arranged above a highest point of the discharge pipe in the operating condition of the appliance.

16. The water-conducting household appliance according to claim 14, wherein the discharge pipe, for removing flow medium to be pumped off, has a first pipe section that is vertical in the operating condition of the appliance and a second pipe section bent in a U-shape and arranged above the first pipe section and connected to the first pipe section, and the channel of the pipe ventilating device is connected to the discharge pipe in the direction of discharge of the flow medium after the second pipe section.

17. The water-conducting household appliance according to claim 14, wherein the household appliance is configured as a dishwasher.

\* \* \* \* \*